(12) United States Patent
Schaffer et al.

(10) Patent No.: US 6,460,659 B1
(45) Date of Patent: Oct. 8, 2002

(54) BRAKE WEAR INDICATOR

(75) Inventors: James W. Schaffer, Montgomery; Richard J. Smith, Batavia, both of IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/732,466

(22) Filed: Dec. 7, 2000

(51) Int. Cl.[7] .............................................. F16D 66/00
(52) U.S. Cl. ............................ 188/1.11 W; 188/1.11 R; 188/71.5
(58) Field of Search ..................... 188/1.11 W, 1.11 E, 188/1.11 L, 1.11 R, 71.5

(56) References Cited

U.S. PATENT DOCUMENTS

| | | |
|---|---|---|
| 2,644,549 A | 7/1953 | Cagle |
| 3,018,852 A | 1/1962 | Stanton |
| 3,376,959 A | 4/1968 | Holcomb, Jr. et al. |
| 4,084,671 A | 4/1978 | Ternehall |
| 4,186,822 A | 2/1980 | Khuntia et al. |
| 4,374,375 A * | 2/1983 | Allori et al. ............ 188/1.11 W |
| 4,606,435 A * | 8/1986 | Johnson .................. 188/1.11 L |
| 4,845,468 A * | 7/1989 | Stark ...................... 188/1.11 L |
| 5,035,303 A * | 7/1991 | Sullivan ................ 188/1.11 W |
| 5,088,967 A * | 2/1992 | Opitz et al. ............ 188/1.11 R |
| 5,186,284 A | 2/1993 | Lamela et al. |
| 5,228,541 A | 7/1993 | Plude |
| 5,238,093 A * | 8/1993 | Campbell ................ 192/30 W |
| 5,492,203 A | 2/1996 | Krampitz |
| 5,642,793 A | 7/1997 | Ljsone |
| 5,678,662 A | 10/1997 | Giorgetti et al. |
| 5,697,472 A | 12/1997 | Walker et al. |
| 5,767,768 A | 6/1998 | DiSaverio |
| 6,076,639 A * | 6/2000 | Dahlen et al. ......... 188/1.11 R |

* cited by examiner

*Primary Examiner*—Jack Lavinder
*Assistant Examiner*—Mariano Sy
(74) *Attorney, Agent, or Firm*—Nexsen Pruet; Liza J Meyers

(57) ABSTRACT

A machine operator or service person is alerted to the excessive wear condition of friction discs in friction couplings or brakes of construction machinery by being provided with a visual indication of wear of the friction discs in one embodiment, a wear indicating pin element is shifted axially by a brake piston and the position of the end of the pin element is visible through a window in a brake housing, thereby providing a visual indication of the wear condition of the friction disc. In a second embodiment of the invention the excessive wear condition of the friction discs is revealed by a signal light which is activated by a pressure switch responding to the pressure of the fluid delivered to a brake cylinder when the brake piston moves a predetermined distance in application of the brake.

6 Claims, 3 Drawing Sheets

US 6,460,659 B1

BRAKE WEAR INDICATOR

TECHNICAL FIELD

This invention relates generally to a brake wear indicator and more particularly to a device providing visible indication of excessive wear of a friction material in a friction coupling.

BACKGROUND ART

Friction couplings in the form of vehicle brakes and clutches are widely used in construction machinery to facilitate the stop and go movement of such machinery. The friction couplings used in construction machinery typically have one or more friction discs which rotate within a brake housing between a brake piston and a reaction member. The number of friction discs used depends on the braking requirement of the machine in which the friction coupling is used. In the instance where multiple friction discs are used, reaction discs splined to the brake housing are interleaved between the friction discs splined to a rotating member. The rotating friction discs typically have friction material bonded to each side thereof. When braking of the rotating member is desired, the brake piston is actuated, by fluid pressure, to move the piston axially against the adjacent reaction disc thereby capturing the friction discs between the reaction discs and a reaction surface on the brake housing.

Friction braking creates heat and friction which results in a primary wear of the friction material on the friction discs and a secondary wear of the reaction discs. To prevent unscheduled machinery down time, the friction discs need to be replaced before they wear to a point where they are incapable of performing the braking function, namely, before all the friction material has been worn away from the friction discs.

Various devices have heretofore been employed to determine brake wear. U.S. Pat. No. 5,697,472 issued Dec. 16, 1997 to Gordon L. Walker et. al. for a Wear Indicator discloses a brake wear indicating apparatus which includes a brake wear monitoring pin supported in a bore of a brake housing and positioned for end abutment with, and axial movement by, a power operated brake piston. Upon retraction of the brake piston, O-rings on the pin maintain the pin in the position to which it was moved by the brake piston. Upon removal of a plug at the exterior end of the bore, the axial position of the pin is measured and compared with the position of the pin when the brake was in an unworn condition to provide a determination of the amount of brake wear. This method of determining brake wear requires a measuring apparatus and a significant amount of calibration time to determine brake wear.

Heretofore, it has also been recognized that it is desirable to transmit a signal to the vehicle operator when excessive wear occurs in a friction coupling. U.S. Pat. No. 5,642,793 issued Jul. 1, 1997 to Knut T. Ljosne on an Indicator Device for Signaling that the Wear Limit has been Reached for Servo-operated Clutches discloses a clutch operating apparatus in which the clutch pedal is harder to depress when the clutch becomes excessively worn. The difficulty in operation of the clutch pedal is a matter of feel and can be interpreted differently by different operators. Thus this system of determining excessive wear of a friction coupling is viewed as being inexact.

The present invention is directed to overcoming one or more of the problems set forth above.

DISCLOSURE OF THE INVENTION

In one aspect of the invention a brake wear indicator device is provided for a fluid pressure operated friction coupling disposed between a machine housing and a torque-transmitting member. The extent of the movement of a fluid operated brake piston in applying the brake causes a brake wear indicator to provide a visual signal indicating that excessive wear of frictional material of the brake has occurred. In one embodiment of the invention the visual signal is the position of the end of a pin viewable through a window in the brake housing, the piston being shifted axially by the brake piston as the friction surfaces of the brake wear away. In a second embodiment of the present invention, the visual signal is a light turned on by a pressure switch activated by the pressure of the fluid operating the brake piston when the brake piston moves in a brake applying direction a predetermined distance.

BEST MODE FOR CARRYING OUT THE INVENTION

Figure 1:
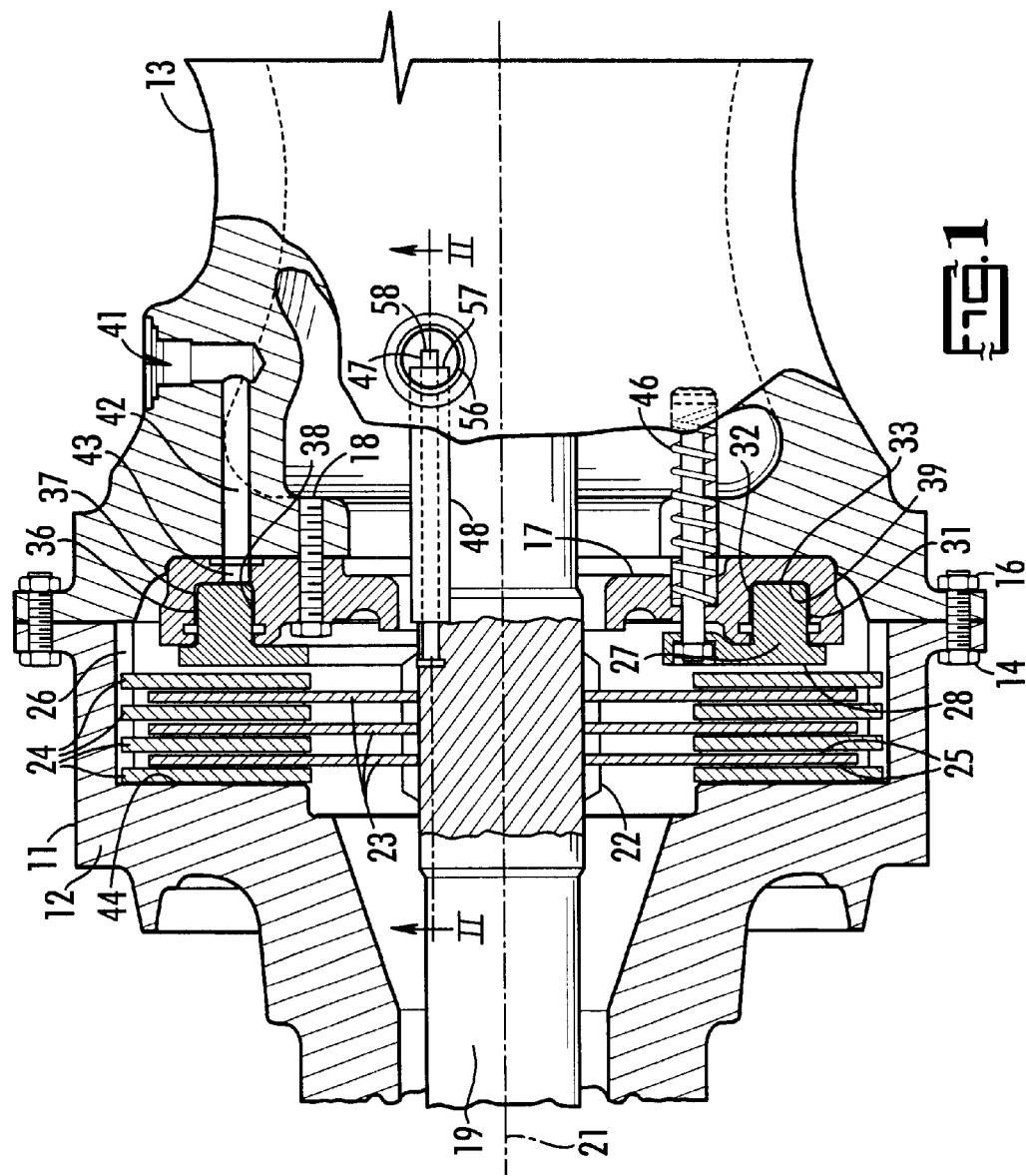
FIG. 1 is a partial section of a brake housing containing a power operated multiple disc brake having a visible brake wear indicator.
Figure 2:
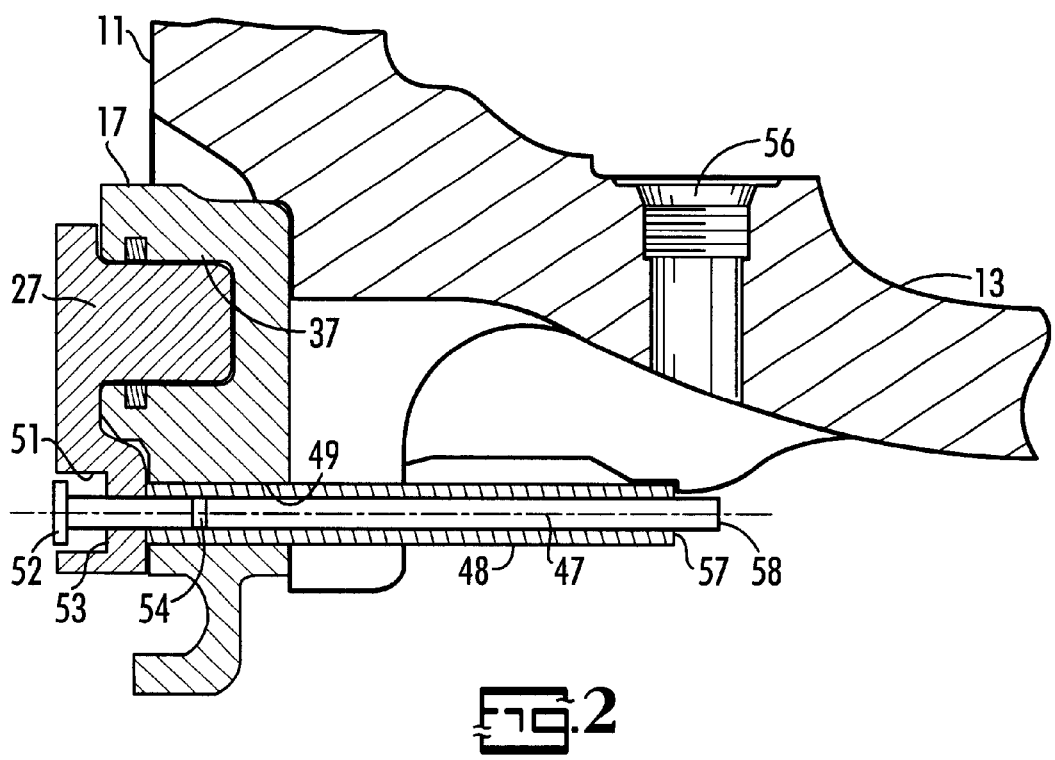
FIG. 2 is a partial section taken on the line II—II in FIG. 1.

In the embodiment of the invention illustrated in FIGS. 1 and 2, a friction coupling in the form of a multiple disc brake includes a stationary brake housing 11 made up of housing segments 12, 13 bolted together by bolts 14 and nuts 16 and a brake cylinder segment 17 secured to the housing segment 13 by cap screws 18. A torque transmitting member, in the form of a power shaft 19 extends through the brake housing for rotation on its axis 21 and includes splines 22 to which three friction discs 23 are coaxially connected. The friction discs 23 have abradable friction material 25 secured to each of their axially opposite sides. The friction discs 23 are interleaved between nonrotating reaction discs 24 connected to splines 26 on housing segment 12.

Braking action is effected by an annular brake piston 27 which has a reaction surface 28 in axially confronting relation to the reaction disc 24 at the right end of the disc stack as viewed in FIG. 1. The ring shaped brake piston 27 includes a radially outward facing cylindrical surface 31, a radially inward facing cylindrical surface 32 and a bottom surface 33 disposed at right angles to the cylindrical surfaces 31, 32. A brake cylinder 36 is formed in the brake cylinder segment 17 for housing the brake piston 27 and includes a radially inward facing cylindrical surface 37, a radially outward facing cylindrical surface 38 and a flat bottom surface 39 at the closed end of the brake cylinder 36. The brake piston 27 extends axially from the open end of the brake cylinder 36. Pressurized fluid is delivered to the pressure chamber at the closed end of the brake cylinder 36 by a passageway in the brake housing 11 which includes a fluid port 41 and a fluid passage 42 in housing segment 13 and an opening 43 in the brake cylinder 36.

When pressurized fluid is delivered to the pressure chamber at the closed end of the brake cylinder 36, the brake piston is moved axially to the left, as viewed in FIG. 1, in a brake applying direction so as to engage the adjacent reaction disc 24 causing the stack of discs 23, 24 to be captured between the brake piston and a reaction surface 44 on the brake housing segment 12. Upon release of pressurized fluid from the brake cylinder 36, a plurality of back-off springs 46, only one of which is shown, cause the brake piston 27 to move in a brake retracted direction and the brake is returned to its non-engaged condition, as shown in FIG. 1.

A brake wear indicator pin element or pin 47 is reciprocally mounted in a sleeve element or sleeve 48 which in turn, as shown in FIG. 2, is press fit in a bore 49 in the brake cylinder segment 17 of the housing 11. The pin 47 extends through a stepped diameter bore in the brake piston 27, which provides a pocket 51 for a head 52 of the pin 47. When the brake is engaged, the brake piston 27 will move to the right, as viewed in FIG. 2, and the head 52 of the pin 47 engages a bottom surface 53 of the pocket 51, thereby causing the pin 47 to move with the brake piston 27 when the latter is actuated. When the brake piston 27 is retracted by the retraction springs 46, a friction member, in the form of an O-ring 54 in an annular groove in the pin 47, holds the pin 47 in the position to which it was moved by the brake piston 27 by the most recent application of the brake.

A window or view port 56 is formed in the housing segment 13 perpendicular to the pin 47 and is positioned so that a shoulder 57 at the end of the sleeve 48 and an end 58 of the pin are clearly visible through the window 56. The view port 56 is threaded to receive an easily removable threaded plug, not shown.

Figure 3:
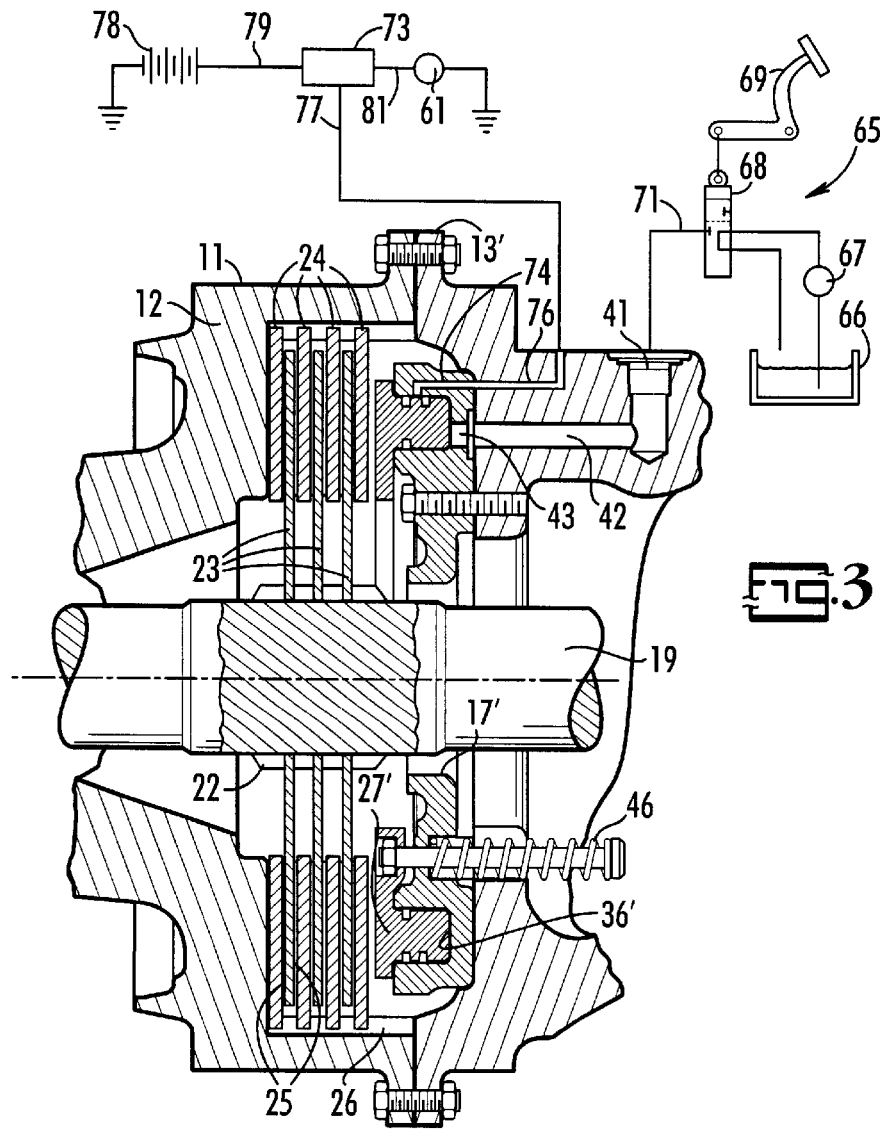
FIG. 3 is a section of a power operated multiple disc brake having a brake wear indicator in the form of a signal light.
Figure 4:
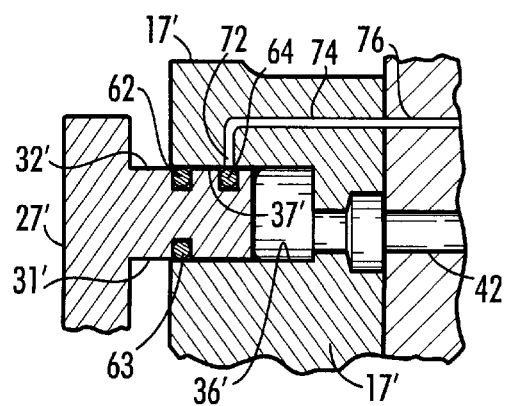
FIG. 4 is a partial section showing the brake piston of FIG. 3 in a signal generating position.

FIGS. 3 and 4 illustrate an embodiment of the invention in which a visual indication of brake wear is provided by a single light 61 at the operator's station, now shown. In describing the embodiment shown in FIGS. 3 and 4, components common to both embodiments are given corresponding numbers with a prime symbol. The brake piston 27', the brake cylinder 36' and the brake cylinder segment 17' in the second embodiment of the invention are somewhat different than their corresponding components of the embodiment illustrated in FIGS. 1 and 2. A pair of O-ring seals 62, 63 are installed in annular grooves in the radially inward and the radially outward facing cylindrical surfaces 31', 32' of the brake piston 27' to seal the latter relative to the brake cylinder 36'. An additional O-ring seal 64 is installed in an annular groove in the brake piston 27' in axially inward spaced relation to the O-ring seal 62. In the retracted position of the brake piston 27', a fluid port 72 is positioned between the axially spaced seals 62, 64, thereby blocking it from fluid communication with the pressure fluid in the pressure chamber at the closed end of the brake cylinder 36'.

The brake is operated by a brake control 65 which includes a reservoir 66, a pump 67, a brake valve 68 and a brake pedal 69 operatively connected in controlling relation to the brake valve 68. When the valve 68 is shifted downwardly to a fluid delivery position, pressure fluid is delivered to the closed end of the brake cylinder 36' by way of a conduit 71, the port 41, the passage 42 and the opening 43. The port 72 is connected in fluid communication with a pressure switch 73 by way of a pair of fluid passages 74, 76 in the brake cylinder segment 17' and the housing segment 13, respectively, and a conduit 77. When the pressure switch 73 is subjected to the pressure of the fluid delivered to the pressure chamber of the brake cylinder 36' during a braking operation, it connects the signal light 61 to a source of electricity, such as a vehicle battery 78, through a circuit which includes a pair of lines 79, 81 and the machine operator is alerted to the excessive brake wear condition by the illumination of the signal light 61.

INDUSTRIAL APPLICABILITY

The visual signal of this invention is designed to advise the machine operator and service personnel that the friction material 25 is worn from the friction discs 23 to such an extent that substantial further use of the machine can lead to braking failure and unscheduled down time. The accessibility of the signal provided by this invention provides greater assurance that the friction coupling will be renewed prior to failure and the timely forewarning of the depletion of the friction material 25 on the friction discs 23 permits an orderly scheduling of brake repair work and of machine replacement at the work site.

When the embodiment shown in FIGS. 1 and 2 is incorporated in a construction vehicle, the operator or maintenance person is informed of the wear condition of the brake upon removing the plug, not shown, from the view port 56. The view afforded through the view port is at right angles to the pin 47 and its supporting sleeve 48, thus optimizing the accuracy of the visual indication of break wear.

If the brakes of a construction machine incorporating the wear indicator illustrated in FIGS. 3 and 4 become excessively worn, the brake piston 27' will extend sufficiently far out of the open end of the brake cylinder 36', upon application of the brake, to unblock the port 72 in the radially inward facing cylindrical surface 37' of the cylinder 36', thus subjecting the pressure switch 73 to the pressure of the fluid delivered to the brake cylinder 36'. When the brake is subsequently released the port 72 is again in a blocked position between the O-ring seals 62, 24 and the trapped pressure fluid causes the pressure switch 73 to remain in an on position.

Other aspects and features of the present invention can be obtained from a study of the drawings, the disclosure and the appended claims.

What is claimed is:

1. A machine having a housing, a rotatable torque transmitting member in said housing and a source of fluid pressure, said machine comprising:

a friction coupling including:

a reaction surface on said housing transverse to the axis of said torque transmitting member;

a friction disc connected coaxially to and for rotation with said torque transmitting member; said friction disc including abradable friction material on its axially opposite sides;

a fluid operated brake piston mounted within said housing in coaxial relation to said torque transmitting member for axial movement in a brake applying direction, in which said brake piston is moved into engagement with said friction disc to capture it against said reaction surface and for axial movement in a brake retracted direction in which said brake piston moves away from said friction disc; and a brake wear indicator operatively associated with said brake piston providing a visual indication that excessive wear of said friction material has occurred when said brake piston moves in said brake applying direction a predetermined distance, the brake wear indicator including:

a pin element mounted within said housing for axial movement in the direction of said axis of said torque transmitting member, said pin element including an abutment surface near one of its axially opposite ends engageable with said brake piston when said brake piston is moved in said brake applying direction; and a window in said housing permitting an approximate right angle view of the other axial end of said pin element, the position of said other axial end of said pin element in said window being indicative of the wear condition of said friction coupling.

2. The machine of claim 1 including a reference shoulder in said housing near said other axial end of said pin element, the position of said other axial end of said pin element relative to said shoulder being indicative of the wear condition of said friction coupling.

3. The machine of claim 1 including a bore in said housing parallel to said axis of said torque transmitting member and a sleeve element mounted in said bore and presenting axially opposite ends, said pin element being reciprocally mounted in said sleeve element with said other axial end of said pin element extending from one axial end of said sleeve element, said one axial end of said sleeve element constituting said referenced shoulder.

4. The machine of claim 1 wherein the distance that said pin element extends beyond said one axial end of said sleeve element indicates the remaining thickness of said friction material on said friction discs.

5. The machine of claim 3 including an annular groove in one of said pin elements and said sleeve elements and a friction ring in said annular groove, said friction ring maintaining said pin element in the position to which it is adjusted by said brake piston.

6. The machine of claim 5 wherein said annular groove is in said pin element.

* * * * *